Patented Dec. 11, 1934

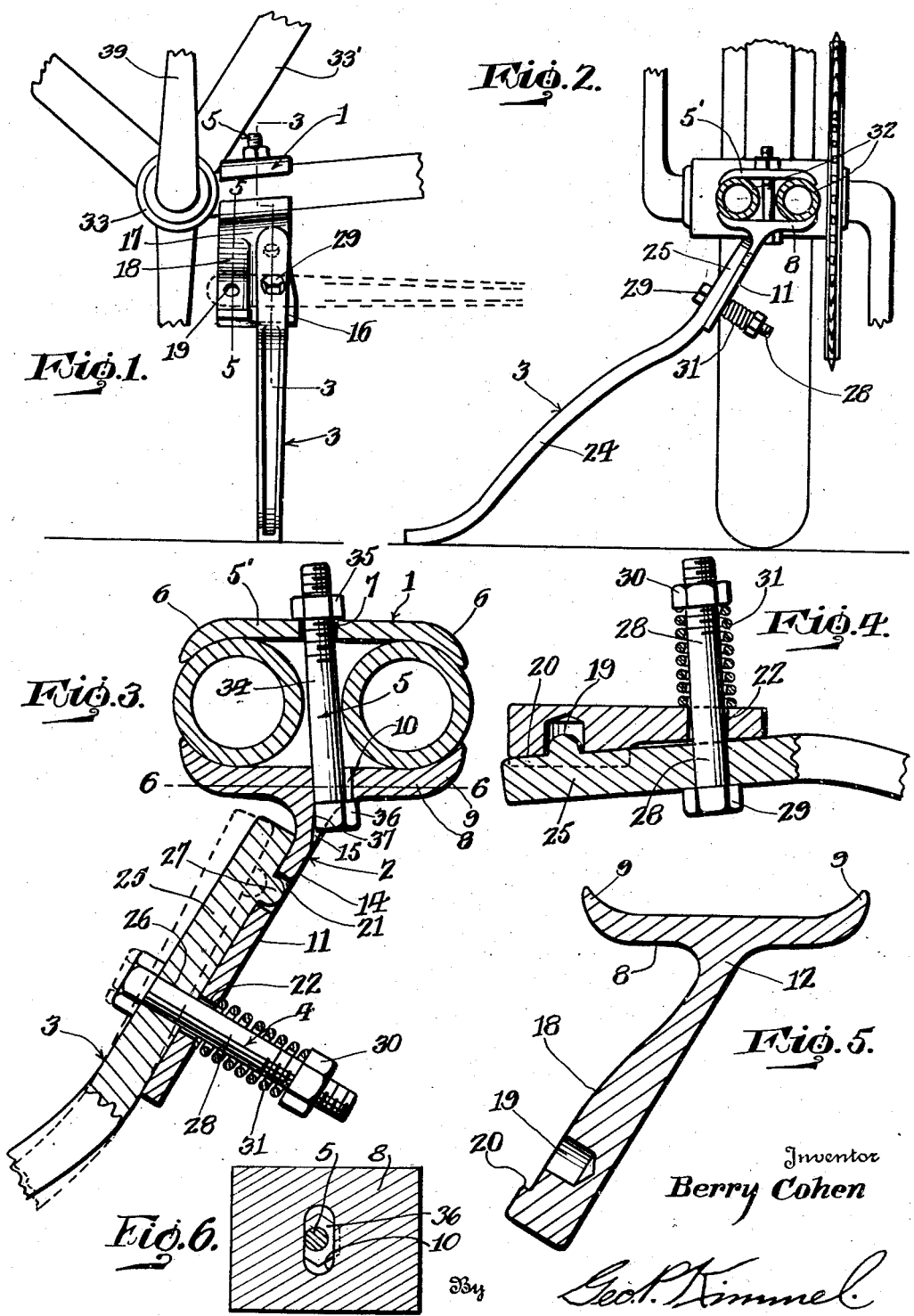

1,984,299

UNITED STATES PATENT OFFICE 1,984,299

BICYCLE STAND

Berry Cohen, Atlanta, Ga.

Application April 19, 1933, Serial No. 666,903

9 Claims. (Cl. 208—79)

This invention relates to a stand for maintaining a bicycle in an upright position when the latter is not in use, and has for its object to provide, in a manner as hereinafter set forth, a stand for the purpose referred to connected to and forming a permanent part of the bicycle and so constructed and arranged to enable it to be expeditiously adjusted to and from supporting position when occasion requires.

A further object of the invention is to provide, in a manner as hereinafter set forth, a stand for the purpose referred to connected to the bicycle frame at a point to prevent the operation of the latter unless the stand is in non-supporting position.

A further object of the invention is to provide, in a manner as hereinafter set forth, a stand for the purpose referred which is positioned in close proximity to the hanger box of the bicycle and when arranged in supporting position is disposed in the path of one of the cranks of the machine, whereby if the rider attempts to start off without shifting the stand to non-supporting position the crank will strike the stand and indicate to the driver that the stand is in supporting position.

Further objects of the invention are to provide, in a manner as hereinafter set forth, a stand for the purpose referred to which is simple in its construction and arrangement, strong, durable, extendible, compact when in non-extended position, readily secured to the frame of the bicycle, thoroughly efficient in its use, expeditiously and conveniently adjusted or extended to and from active position, and comparatively inexpensive to manufacture.

To the above ends essentially and to others which may hereinafter appear the invention consists of such parts, and such combination of parts which fall within the scope of the invention as claimed.

In the drawing:—

Figure 1 is a fragmentary view in side elevation of a bicycle showing the adaptation therewith of the stand in supporting position.

Figure 2 is a fragmentary view in transverse section of a bicycle showing the stand attached therewith and in rear elevation.

Figure 3 is a section on line 3—3 Figure 1.

Figure 4 is a fragmentary view in longitudinal section of the stand in non-extended position.

Figure 5 is a section on line 5—5 Figure 1.

Figure 6 is a section on line 6—6, Figure 3.

The stand includes a clamping member 1, a stationary combined clamping, retaining and hanger element 2, a shiftable, pivotally mounted support 3, a spring controlled coupling device 4 between element 2 and support 3, and connecting means 5 between member 1 and element 2.

The member 1 is in the form of a rectangular plate 5' having curved downturned end portions 6 and an opening 7 intersected by its longitudinal median and positioned adjacent to one side of its transverse median.

The element 2 includes a rectangular head piece 8 having curved upturned end portions 9 and an oval shaped slot 10 intersected by its longitudinal median and position adjacent to one side of its transverse median. The slot 10 is offset with respect to opening 7. The element 2 further includes an arm 11 depending from and disposed at an outward inclination from its top to its bottom with respect to the lower face of head piece 8. The upper end of arm 11 is flared, as at 12 and merges into the lower face of head piece 8 at the transverse median of the latter. The inner side face 14 of the flared portion 12, centrally thereof, is vertically grooved as at 15 to form a continuation of the wall of slot 10 at one end of the latter. The lower portion 16 of arm 11 is of greater width than the upper portion thereof. The outer side face 17 of arm 11 is formed with a lengthwise extending cam surface 18, a socket 19 and a stop 20. The socket 19 is arranged at the lower end of the cam surface 18 and the stop 20 below and in close proximity to the socket 19. The cam surface 18 is arranged to one side of the longitudinal median of arm 11. Adjacent the other side of the longitudinal median of arm 11 and in proximity to the flared portion 12 the arm 11 is formed with an inner opening 21. The lower portion 16 of arm 11 and rearwardly with respect to opening 21 is provided with an outer opening or slot 22.

The support 3 comprises a bar 24 of ogee curvature having a substantially straight upper terminal portion 25 provided with an opening 26 and a rounded latching lug 27 spaced from the latter. The lug 27 is formed on the inner face of portion 25 in proximity to its free end.

The spring controlled coupling device comprises a headed bolt 28 which passes through slot 21 and opening 26. The head 29 of bolt 28 bears against the outer face of portion 25. Mounted on bolt 28, and interposed between arm 11 and an adjustable nut 30, on bolt 28, is a coiled spring 31 for maintaining the inner side face of portion 25 against the outer side face of arm 11. The support 3 is pivoted upon arm 11 by bolt 28, and is shiftable from and to supporting section against the pulling action of spring 31.

When support 3 is in supporting position the lug 27 engages in opening 21. When it is shifted from supporting position terminal portion 25 rides upwardly on cam surface 18 until the lug 27 engages in socket 19. The shifting movement of the support from its active position is arrested by stop 20. When lug 27 engages in opening 21 the spring coacts with the latter and the lug to latch support 3 in active position. When lug 27 engages in socket 19, the spring coacts with the latter and lug to latch support 3 in inactive position.

The connecting means 5 acts to maintain in clamping position the plate 5' and head piece 8 with respect to the braces 32 which are arranged between the hanger box 33 and the rear fork, not shown of the bicycle frame 33'. The connecting means includes a headed bolt 34 and a nut 35. The head 36 of bolt 34 is cut away at one side as at 37 to provide a flattened surface. The bolt is disposed at an inclination with respect to plate 5' and head piece 8 and is extended through opening 7 and slot 10. The flattened surface is arranged in groove 15 whereby the shank of the bolt can seat against an end wall of slot 10. The head 36 abuts the lower face of head piece 8. The nut 35 bears against the upper face of plate 5'. The downturned end portions 6 and upturned end portions 9 bind against the braces 32.

As the upper end of the arm 11 is formed integral with and extends laterally from each side of the transverse median of head piece 8, provision should be had to prevent the weakening of the arm at its upper portion to any great extent when providing a clearance for the head of bolt 36, for two reasons, one to prevent the arm from snapping off when abutting an obstruction, and the other because said end receives the thrust of the weight of the bicycle when the stand is in supporting position. If the head piece 8 had its slot 10 extending an equal distance from each side of its transverse median and the member 1 had its opening 7 disposed in a like manner, then the upper portion of arm 11 would have to be grooved to an extent to weaken such end because the opening, slot and groove would then be arranged in concentric alignment, but by arranging the opening, slot and groove in the manner as shown and described, the upper end of arm 11 is so formed to overcome the objection referred to, and it follows by the arrangement shown and described, that the connecting means 5 must be disposed at an inclination with respect to member 1 and head piece 8 for clamping them together and also to provide for the bolt 36 to extend between and clear the brace members 32.

When the support 3 is shifted to active position it is disposed at an inclination with respect to the frame 33', and arranged in the path of the pedal carried by the crank arm 39, so if the rider does not move the support 3 to inactive position the pedal will strike it. The cam surface 18 forces the terminal portion 25 away from the non-cammed portion of the arm 11 to increase the tension of spring 26 whereby when the lug engages in the socket the support 3 will be held from accidental displacement when latched. The spring 31 further functions to prevent the accidental displacement of support 3 when the latter is latched in its active position.

The member 1, element 2 and support 3 will be formed from light metallic material, preferably aluminum.

What I claim is:

1. In a bicycle stand, an apertured clamping member for seating upon a portion of the frame of the bicycle, an apertured head piece for positioning against the lower face of said portion and including an outwardly depending means for selectively latching a shiftable support therewith in shifted and non-shifted positions, said means having its upper end disposed at the transverse median of the lower face of the head piece and flared outwardly and inwardly, the aperture in said head piece being offset with respect to the aperture in said member, the upper portion of said means being grooved centrally of its inner face, said groove registering with a part of the wall of the aperture in the head piece, and a connecting device extending through the aperture of said member and head piece for securing them to said frame portion, said device being inclined with respect to said member and head piece and having its lower part seated in said groove and abutting the lower face of the head piece and its upper part abutting the upper face of said member.

2. In a bicycle stand, a clamping member, a stationary combined clamping, retaining and hanger element including an outwardly directed depending inclined arm having its upper end disposed substantially centrally of the element and having a part of its outer side face formed with a cam surface provided with a socket, said arm adjacent said cam surface being formed with an inner and an outer opening, an extendible pivotally mounted support having an end terminal portion adapted when the support is extended to oppose the apertured part of said arm, said terminal portion being adapted to ride on and off said cam surface when the support is shifted respectively to and from non-extended position and being provided with a lug selectively engaging in said inner opening and socket for latching the support respectively in extendible and non-extendible positions, a spring controlled device for coupling said support and arm together, extending through said outer opening and providing a pivot for the support, and means for securing said member and element to a portion of the frame of a bicycle.

3. In a bicycle stand, a clamping member, a stationary combined clamping, retaining and hanger element including an outwardly directed depending inclined arm having its upper end disposed substantially centrally of the element and having a part of its outer side face formed with a cam surface provided with a socket, said arm adjacent said cam surface being formed with an inner and an outer opening, an extendible pivotally mounted support having an end terminal portion adapted when the support is extended to oppose the apertured part of said arm, said terminal portion being adapted to ride on and off said cam surface when the support is shifted respectively to and from non-extended position and being provided with a lug selectively engaging in said inner opening and socket for latching the support respectively in extendible and non-extendible positions, a spring controlled device for coupling said support and arm together, extending through said outer opening and providing a pivot for the support, means for securing said member and element to a portion of the frame of a bicycle, and a stop at the outer end of the cam surface for limiting the shifting movement of said support to non-extended position.

4. In a bicycle stand, a clamping member, a stationary combined clamping, retaining and hanger element including an outwardly depending inclined arm having its upper end disposed substantially centrally of the element and having a part of its outer side face formed with a cam surface provided with a socket, said arm adjacent said cam surface being formed with an inner and an outer opening, an extendible pivotally mounted support having an end terminal portion adapted when the support is extended to oppose the apertured part of said arm, said terminal portion being adapted to ride on and off said cam surface when the support is shifted respectively to and from non-extended position and being provided with a lug selectively engaging in said inner opening and socket for latching the support respectively in extendible and non-extendible positions, a spring controlled device for coupling said support and arm together, extending through said outer opening and providing a pivot for the support, said arm having the upper end of its inner side face grooved, means positioned at its lower end in said groove, extending through the upper part of said element and through said member for securing the latter and said element to a portion of the frame of a bicycle and disposed at an inclination with respect to said frame portion, and a stop at the outer end of the cam surface for limiting the shifting movement of said support to non-extended position.

5. In a bicycle stand of that type including an extendible spring controlled pivotally mounted latchable supporting element, a structure for fixedly securing against the lower face of a frame portion of the bicycle and adapted to suspend and latch said element and connect the latter with said frame portion, said structure including a head piece formed with an opening offset with respect to the transverse center thereof, and an outwardly directed depending inclined arm having its upper end integral with the lower face of said head piece substantially at the transverse median of the latter and being formed centrally of its inner side face with a groove having its wall merging into the wall of said opening, said arm having a part of its outer side face formed with a cam surface provided with a socket, said arm adjacent said cam surface being formed with an inner and outer opening, said socket and inner opening providing for latching the element in non-extended and extended positions respectively, and said outer opening being adapted to receive a pivot for said element.

6. In a bicycle stand of that type including an extendible spring controlled pivotally mounted latchable supporting element, a structure for fixedly securing against the lower face of a frame portion of the bicycle and adapted to suspend and latch said element and connect the latter with said frame portion, said structure including a head piece formed with an opening offset with respect to the transverse center thereof, and an outwardly directed depending inclined arm having its upper end integral with the lower face of said head piece substantially at the transverse median of the latter and being formed centrally of its inner side face with a groove having its wall merging into the wall of said opening, said arm having a part of its outer side face formed with a cam surface provided with a socket, said arm adjacent said cam surface being formed with an inner and an outer opening, said socket and inner opening providing for latching the element in non-extended and extended positions respectively, said outer opening being adapted to receive a pivot for said element, and said arm being formed at the outer end of said cam surface with a stop for limiting the movement of the element when moved to non-extended position.

7. In a bicycle stand, a clamping member, a stationary combined clamping, retaining and hanger element including an outwardly directed depending inclined arm having its upper end disposed substantially centrally of the element and having a part of its outer side face formed with a cam surface provided with a socket, said arm adjacent said cam surface being formed with an inner and an outer opening, an extendible pivotally mounted support of ogee curvature having an end terminal portion adapted when the support is extended to oppose the apertured part of said arm, said terminal portion being adapted to ride on and off said cam surface when the support is shifted respectively to and from non-extended position and being provided with a lug selectively engaging in said inner opening and socket for latching the support respectively in extendible and non-extendible positions, a spring controlled device for coupling said support and arm together, extending through said outer opening and providing a pivot for the support, and means for securing said member and element to a portion of the frame of a bicycle.

8. In a bicycle stand, a clamping member for seating upon the upper face of a portion of the frame of the bicycle, a hanger element including a head for positioning against the lower face of said portion of the frame and an arm having its upper end integral with the lower face of said head at its transverse median, said arm depending throughout from said head at an inclination sidewise with respect to the bicycle frame, means extending through said head and member for coupling the latter and said element to said portion of the bicycle frame, said arm being formed with an upper opening and a socket non-aligning with said opening, the said opening being arranged in proximity to one side and between the transverse median and upper end of said arm, said socket being arranged in proximity to the other side and between the transverse median and lower end of said arm, said arm having a lower opening arranged in spaced alignment with said upper opening and socket, an extendible support having a curved outer end for seating upon a surface when the support is extended, spring controlled means extending through said support and lower opening for resiliently and pivotally connecting said support to said arm and for maintaining a stretch of the support in abutting relation with respect to the forward face of the arm when the support is extended and non-extended, and said support having its inner face formed with a lug for selectively engaging in said socket and upper opening and coacting with said spring controlled means for respectively latching said support in extendible and non-extendible positions.

9. In a bicycle stand, a hanger element including a head having integral therewith at the transverse median of its lower face a depending arm, the latter being inclined throughout sidewise with respect to the frame of the bicycle, means for coupling said head to a portion of the bicycle frame, an extendible support having an upcurved outer end for seating upon a surface when the support is extended, means for pivotally and resiliently connecting said support to said arm, and said arm and support having coacting means coacting with said connecting means for latching said support in extended and non-extended positions.

BERRY COHEN.